US010699389B2

(12) United States Patent
Van der Auwera et al.

(10) Patent No.: US 10,699,389 B2
(45) Date of Patent: Jun. 30, 2020

(54) FISHEYE RENDERING WITH LENS DISTORTION CORRECTION FOR 360-DEGREE VIDEO

(71) Applicant: QUALCOMM Incorporated, San Diego, CA (US)

(72) Inventors: Geert Van der Auwera, Del Mar, CA (US); Muhammed Coban, Carlsbad, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 42 days.

(21) Appl. No.: 15/495,709

(22) Filed: Apr. 24, 2017

(65) Prior Publication Data

US 2017/0345136 A1    Nov. 30, 2017

Related U.S. Application Data

(60) Provisional application No. 62/340,914, filed on May 24, 2016.

(51) Int. Cl.
*G06T 5/00* (2006.01)
*H04N 5/232* (2006.01)
*G06T 3/00* (2006.01)

(52) U.S. Cl.
CPC .............. *G06T 5/006* (2013.01); *G06T 3/005* (2013.01); *H04N 5/23238* (2013.01)

(58) Field of Classification Search
CPC ...... G06T 3/005; G06T 5/006; H04N 5/23238
See application file for complete search history.

(56) References Cited

U.S. PATENT DOCUMENTS 5,185,667 A * 2/1993 Zimmermann ....... G06T 3/0018
348/143
6,002,430 A   12/1999 McCall et al.
(Continued)

FOREIGN PATENT DOCUMENTS

JP    2010171914 A  *  8/2010

OTHER PUBLICATIONS

Bourke P., "Computer Generated Angular Fisheye Projections", Internet Citation, May 2001 (May 2001), XP002469332, 11 pages, Retrieved from the Internet: URL: http://local.wasp.uwa.edu.au/pbourke/projection/fisheye/ [retrieved on Feb. 8, 2008].
(Continued)

*Primary Examiner* — Mainul Hasan
(74) *Attorney, Agent, or Firm* — Kilpatrick Townsend & Stockton, LLP

(57) ABSTRACT

In various implementations, computing systems and computer-implemented methods can be used for correcting the distortion present in a fisheye image, and rendering the image for display as 360-degree video. In various implementations, a computing device can receive 2-dimensional video data captured by an omnidirectional camera. The computing device can map an image from each video frame to a 3-dimensional hemispherical representation. In various implementations, this mapping can be executed using a polynomial model. The 3-dimensional hemispherical representation can then be used in a 360-degree video presentation, to provide a virtual reality experience.

32 Claims, 11 Drawing Sheets

(56) References Cited

U.S. PATENT DOCUMENTS

| | | |
|---|---|---|
| 7,016,544 B2 | 3/2006 | Boon |
| 2002/0063802 A1* | 5/2002 | Gullichsen ............ G06T 3/0018 348/607 |
| 2003/0103063 A1* | 6/2003 | Mojaver .................. G06T 3/00 345/647 |
| 2004/0105597 A1* | 6/2004 | Lelescu ................ G06T 3/0018 382/276 |
| 2005/0062869 A1* | 3/2005 | Zimmermann ........ G02B 13/06 348/335 |
| 2006/0023105 A1* | 2/2006 | Kostrzewski ......... G06T 3/0018 348/335 |
| 2010/0053325 A1* | 3/2010 | Inagaki ................ G06T 3/0062 348/143 |
| 2010/0309286 A1* | 12/2010 | Chen .................... H04N 19/597 348/43 |
| 2016/0073024 A1* | 3/2016 | Yamamoto ......... H04N 5/23229 348/36 |
| 2016/0142697 A1* | 5/2016 | Budagavi ............. H04N 19/117 348/43 |

OTHER PUBLICATIONS

Bourke P., "Converting a Fisheye Image to Panoramic and Perspective Projection", May 4, 2016 (May 4, 2016), XP055471089, 18 Pages, Retrieved from the Internet: URL: https://web.archive.org/web/20160504053741/http://paulbourke.net/dome/fish2/ [retrieved on Apr. 26, 2018].

International Search Report and Written Opinion—PCT/US2017/029441—ISA/EPO—dated Aug. 31, 2017.

Yagi Y., "Invited Survey Paper Surveys on Image Processing Technologies—Algorithms, Sensors and Applications—Omnidirectional Sensing and Its Applications", IEICE Transactions on Information and Systems, vol. E82-D, No. 3, Jan. 1, 1999, XP055394417, Retrieved from the Internet: URL:http://citeseerx.ist.psu.edu/viewdoc/download?doi=10.1.1.29.8128&rep=rep1&type=pdf, 12 pages.

* cited by examiner

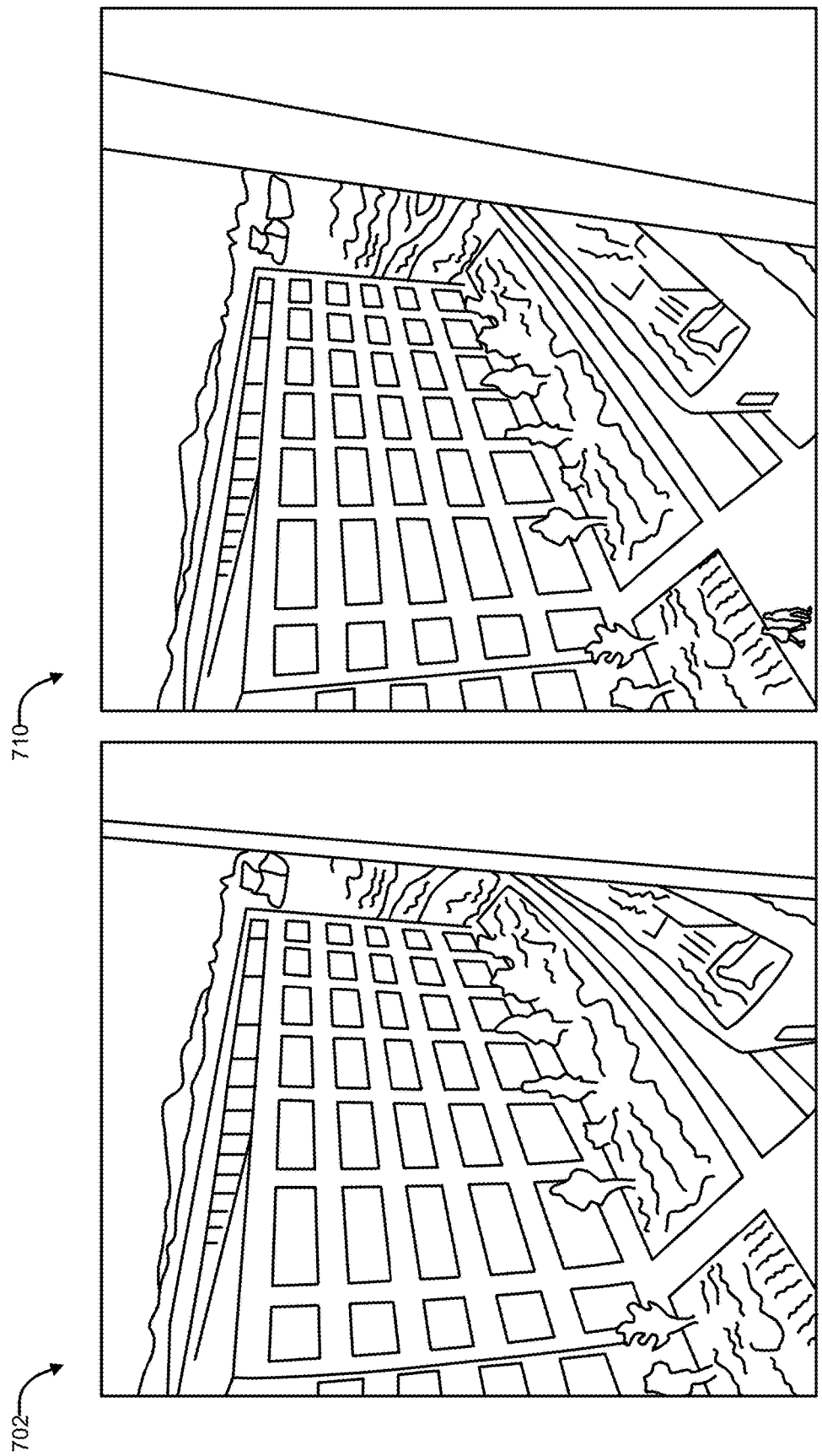

800

802
OBTAINING 2-DIMENSIONAL VIDEO DATA CAPTURED BY AN OMNIDIRECTIONAL CAMERA, WHEREIN THE 2-DIMENSIONAL VIDEO DATA INCLUDES AN IMAGE OF A SCENE, WHEREIN, IN THE IMAGE, THE SCENE HAS BEEN WARPED INTO A CIRCULAR REGION OF THE IIMAGE

804
MAPPING THE IMAGE TO A 3-DIMENSIONAL HEMISPHERICAL REPRESENTATION, WHEREIN MAPPING THE IMAGE INCLUDES MAPPING PIXELS IN THE CIRCULAR REGION OF THE IMAGE TO CORRESPONDING LOCATIONS ON THE 3-DIMENSIONAL HEMISPHERICAL REPRESENTATION, WHEREIN MAPPING THE IMAGE CORRECTS THE WARPING OF THE SCENE.

806
USING THE 3-DIMENSIONAL HEMISPHERICAL REPRESENTATION IN A 360-DEGREE VIDEO PRESENTATION

*FIG. 8*

FISHEYE RENDERING WITH LENS DISTORTION CORRECTION FOR 360-DEGREE VIDEO

CROSS-REFERENCES TO RELATED APPLICATIONS

This application claims the benefit of and priority to U.S. Provisional Application No. 62/340,914, filed May 24, 2016, which is incorporated by reference herein in its entirety.

BRIEF SUMMARY 360-degree video can provide viewers an immersed experience. For example, 360-degree video can provide a viewer with a virtual reality experience, putting the viewer in a virtually different time and/or place. As another example, 360-degree video can provide a viewer with a first-person view of video content captured by a remote device (e.g., an unmanned aerial vehicle, or other device). One method for capturing 360-degree video is to use an omnidirectional camera. Omnidirectional cameras can capture a wide field of view with just a few lenses. The resulting images exhibit a fisheye effect.

In various implementations, provided are systems, methods, and computer-readable medium for rendering fisheye images for a 360-degree video presentation, while correcting distortion inherent in fisheye images. 360-degree video can be captured by omnidirectional cameras that use catadioptic systems and/or fisheye lenses. Such cameras can capture a scene in as few as one or two images. While these images can capture a large amount of information, such as a 180-degree or even 360 degree field of view, the scene is compressed into the image, and thus appear distorted to the human eye. Additionally, the images are 2-dimensional, and need to be mapped to a 3-dimensional representation in order to be displayed by a 360-degree video system.

According to at least one example, a method for processing 360-degree video data is provided. The method includes obtaining 2-dimensional video data captured by an omnidirectional camera. The 2-dimensional video data can include an image of a scene. In the image, the scene has been warped into a circular region of the image. The method further includes mapping the image to a 3-dimensional hemispherical representation. Mapping the image can include mapping pixels in the circular region of the image to corresponding locations on the 3-dimensional hemispherical representation. Mapping the image can correct the warping of the scene. The method further includes using the 3-dimensional hemispherical representation in a 360-degree video presentation.

In another example, an apparatus is provided that includes a memory and a processor configured to process 360-degree video data. The processor is configured to and can obtain 2-dimensional video data captured by an omnidirectional camera. The 2-dimensional video data can include an image of a scene. In the image, the scene has been warped into a circular region of the image. The processor is further configured to and can map the image to a 3-dimensional hemispherical representation. Mapping the image can include mapping pixels in the circular region of the image to corresponding locations on the 3-dimensional hemispherical representation. Mapping the image can correct the warping of the scene. The processor is further configured to and can use the 3-dimensional hemispherical representation in a 360-degree video presentation.

In another example, a computer readable medium is provided having stored thereon instructions that, when executed by a processor, perform a method that includes: obtaining 2-dimensional video data captured by an omnidirectional camera. The 2-dimensional video data can include an image of a scene. In the image, the scene has been warped into a circular region of the image. The method further includes mapping the image to a 3-dimensional hemispherical representation. Mapping the image can include mapping pixels in the circular region of the image to corresponding locations on the 3-dimensional hemispherical representation. Mapping the image can correct the warping of the scene. The method further includes using the 3-dimensional hemispherical representation in a 360-degree video presentation.

In another example, an apparatus is provided that includes means for obtaining 2-dimensional video data captured by an omnidirectional camera. The 2-dimensional video data can include an image of a scene. In the image, the scene has been warped into a circular region of the image. The apparatus further includes means for mapping the image to a 3-dimensional hemispherical representation. Mapping the image can include mapping pixels in the circular region of the image to corresponding locations on the 3-dimensional hemispherical representation. Mapping the image can correct the warping of the scene. The apparatus further include means for using the 3-dimensional hemispherical representation in a 360-degree video presentation.

In some aspects, mapping the image includes using a polynomial equation to project a point in the image to a corresponding point on the 3-dimensional hemispherical representation. The point in the image can provide a pixel to map to the point on the 3-dimensional hemispherical representation.

In some aspects, the warping is non-linear. In these aspects, the methods, apparatuses, and computer-readable medium described above further comprise determining coordinates for a pixel in the 2-dimensional image. The coordinates can be determined using an adjusted radial value, where the adjusted radial value corresponds to the non-linearity of the warping. These aspects further include using the normalized coordinates in the mapping.

In some aspect, the image includes a field of view that is greater than 180 degrees. In these aspects, the methods, apparatuses, and computer-readable medium described above further comprise adjusting coordinates for a pixel in the 2-dimensional image, where the coordinates are adjusted using a radial value that has been scaled according to the field of view. These aspects further include using the adjusted coordinates in the mapping.

In some aspects, the image includes a field of view of at least 180 degrees.

In some aspects, the omnidirectional camera includes a fisheye lens.

In some aspects, the video data is obtained from an encoded bitstream, where the encoded bitstream includes one or more parameters that describe the warping. In these aspects, mapping the image includes using the one or more parameters. In some aspects, the one or more parameters are encoded in a supplemental enhancement information (SEI) message in the encoded bitstream. In some aspects, the encoded bitstream is included in a file formatted according to an ISO base media file format, and wherein the one or more parameters are encoded in a structure in the file. In some aspects, the one or more parameters include at least one or more of a polynomial order, a polynomial coefficient, a polynomial scaling parameter, or a mapping scaling parameter.

In some aspects, an apparatus such as described above can include a mobile device. In some implementations, the mobile device includes the omnidirectional camera. In some implementations, the mobile device includes a display for displaying the 360-degree video presentation.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following drawing figures:

FIG. 7A and FIG. 7B illustrate examples of an image rendered with and without correction.

FIG. 8 illustrates an example of a process for mapping a 2-dimensional fisheye image to a 3-dimensional, hemispherical representation for display in a 360-degree video presentation.

DETAILED DESCRIPTION

Figure 1:
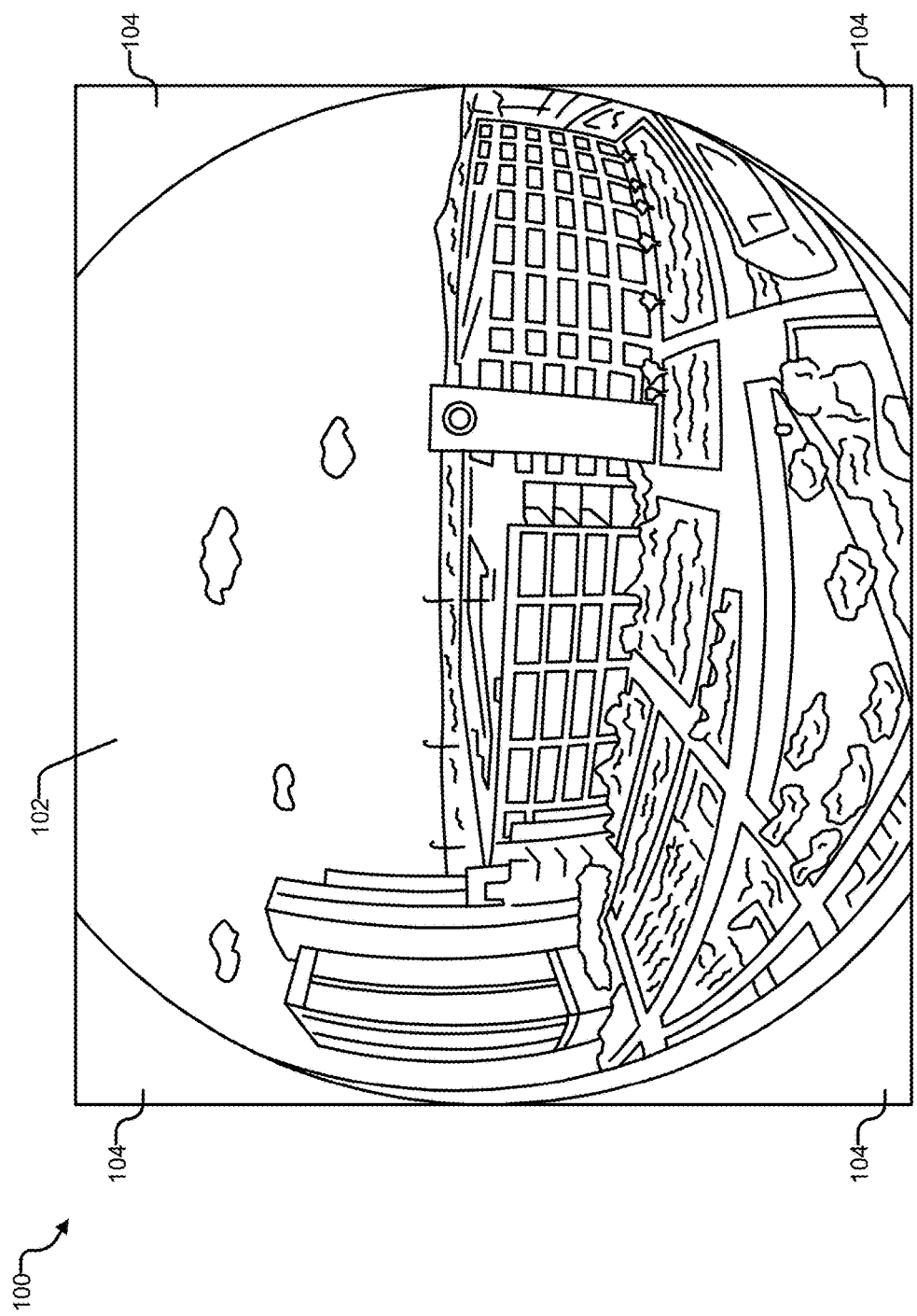
FIG. 1 illustrates an example of a picture captured using a fisheye lens.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of this disclosure. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of this disclosure as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Virtual reality describes a three-dimensional environment that can be interacted with in a seemingly real or physical way. In some cases, a user experiencing a virtual reality environment uses electronic equipment, such as a head-mounted display (HMD) and optionally also clothing (e.g., gloves fitted with sensors), to interact with the virtual environment. As the user moves in the real world, images rendered in the virtual environment also change, giving the user the perception that the user is moving within the virtual environment. In some cases, the virtual environment includes sound that correlates with the movements of the user, giving the user the impression that the sounds originate from a particular direction or source. Virtual reality video can be captured and rendered at very high quality, potentially providing a truly immersive virtual reality experience. Virtual reality applications include gaming, training, education, sports video, and online shopping, among others.

360-degree video is video captured for display in a virtual reality environment. In some applications, video from the real world can be used in the presentation of a virtual reality environment, as opposed to computer-generated graphics, such as may be found in gaming and virtual worlds. In these applications, a user can experience another location in the same way that the user can experience her present location. For example, a user can experience a walking tour of Berlin while using a 360-degree video system that is situated in San Francisco.

A 360-degree video system typically includes a video capture device and a video display device, and possibly also other intermediate devices such as servers, data storage, and data transmission equipment. A video capture device may include a camera set, that is, a set of multiple cameras, each oriented in a different direction and capturing a different view. In some applications, six cameras can be used to capture a full 360-degree view centered on the camera set's location. Some video capture devices may use fewer cameras, such as, for example, video capture devices that capture primarily side-to-side views or that use lenses with a wide field of view. A video generally includes frames, where a frame is an electronically coded still image of a scene. Cameras capture a certain number of frames per second, which is usually referred to as the camera's frame rate.

In some cases, to provide a seamless 360-degree view, image stitching can be performed on the video captured by each of the cameras in the camera set. Image stitching in the case of 360-degree video generation involves combining or merging video frames from adjacent cameras in the area where the video frames overlap or would otherwise connect. The result would be an approximately spherical frame, but similar to a Mercator projection, the merged data is typically represented in a planar fashion. For example, the pixels in a merged video frame may be mapped onto the planes of a cube shape, or some other three-dimensional, planar shape (e.g., a pyramid, an octahedron, a decahedron, etc.). Video capture and video display devices can operate on a raster principle—meaning that a video frame is treated as a grid of pixels—in which case square planes, rectangular planes, or other suitably-shaped planes can be used to represent a spherical environment.

360-degree video frames, mapped to a planar representation, can be encoded and/or compressed for storage and/or transmission. Encoding and/or compression can be accomplished using a video codec (e.g., a H.265/HEVC compliant codec, a H.264/AVC compliant codec, or other suitable codec) and results in a compressed video bitstream (or encoded video bitstream) or group of bitstreams. Encoding of video data using a video codec is described in further detail below.

In some implementations, the encoded video bitstream(s) can be stored and/or encapsulated in a media format or file format. The stored bitstream(s) can be transmitted, for example, over a network, to a receiver device that can decode and render the video for display. Such a receiver device may be referred to herein as a video display device. For example, a 360-degree video system can generate encapsulated files from the encoded video data (e.g., using an International Standards Organization (ISO) base media file format and/or derived file formats).

For instance, the video codec can encode the video data and an encapsulation engine can generate the media files by encapsulating the video data in one or more ISO format media files. Alternatively or additionally, the stored bitstream(s) can be provided directly from a storage medium to a receiver device.

A receiver device can also implement a codec to decode and/or decompress an encoded video bitstream. In cases in which the encoded video bitstream(s) are stored and/or encapsulated in a media format or file format, the receiver device can support the media or file format that was used to pack the video bitstream into a file (or files), and can extract the video (and possibly also audio) data to generate the encoded video data. For example, the receiver device can parse the media files with the encapsulated video data to generate the encoded video data, and the codec in the receiver device can decode the encoded video data.

The receiver device can then send the decoded video signal to a rendering device (e.g., a video display device, player device, or other suitable rendering device). Rendering devices include, for example, head-mounted displays, virtual reality televisions, and other 180 or 360-degree display devices. Generally, a head-mounted display is able to track the movement of a wearer's head and/or the movement of a wearer's eyes. The head-mounted display can use the tracking information to render the part of a 360-degree video that corresponds to the direction in which the wearer is looking, so that the wearer experiences the virtual environment in the same way that she would experience the real world. A rendering device may render a video at the same frame rate at which the video was captured, or at a different frame rate.

Camera sets for capturing 360-degree video can include various omnidirectional cameras, catadioptric cameras (a camera that uses lenses and curved mirrors), and/or cameras equipped with fisheye lenses. One example of an omnidirectional camera is the Ricoh Theta-S, which uses two fisheye lenses that focus in opposite directions.

Omnidirectional cameras, such as catadioptric cameras and cameras with fisheye lenses, typically capture images with a significant amount of distortion. FIG. 1 illustrates an example of a picture 100 captured using a fisheye lens. A fisheye lens is a wide-angle lens that can have a field of view of up to 180 degrees or greater. A camera equipped with two such lenses, positioned back-to-back, can thus capture two images that together provide 360 degrees of view (or more).

The extreme curvature of a lens that enables such a wide field of view, however, also causes the image to become distorted. As illustrated in the example of FIG. 1, the scene 102 that is captured in the picture 100 is circular in shape, and is warped according to the curvature of the lens. Because camera sensors are typically rectangular, the picture 100 is rectangular and the corners 104, where no pixels were captured, are usually blank or black. In this example, the top and bottom of the scene 102 have been cropped. The top and bottom of the scene 102 can be cropped for various reasons. In one illustrative example, the top and bottom of the scene 102 can be cropped due to the shape of the lens and/or the shape of the camera sensor.

The example image 100 captures a large amount of information, in this case a 180-degree field of view. Other images can capture greater than 180 degrees, such as 270 degrees of view. The distortion of the scene 102, however, does not provide the viewer with a very realistic presentation. Additionally, the image 100 is a flat, 2-dimensional representation of a 3-dimensional scene. For presentation as 360-degree video, the image 100 needs to be mapped to a spherical, 3-dimensional (3-D) representation.

In various implementations, provided are systems and methods for correcting the distortion present in a fisheye image, and rendering the image for display as 360-degree video. In various implementations, a computing device can receive 2-dimensional video data captured by an omnidirectional camera. The computing device can map an image from each video frame to a 3-dimensional hemispherical representation. In various implementations, this mapping can be executed using a polynomial model. The 3-dimensional hemispherical representation can then be used in a 360-degree video presentation, to provide a virtual reality experience.

Figure 2B:
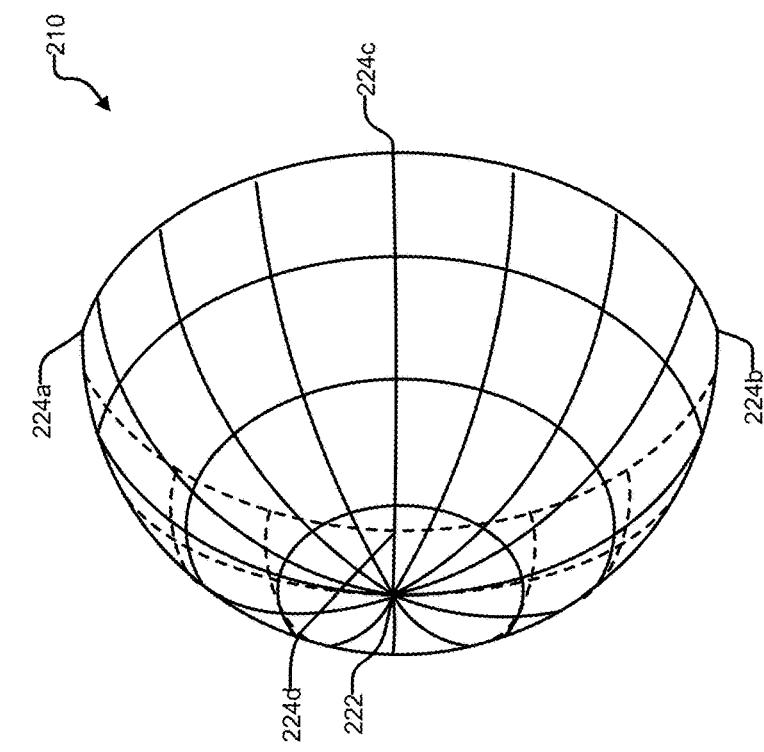
FIG. 2A and FIG. 2B illustrate an example application of the techniques discussed herein.
Figure 2A:
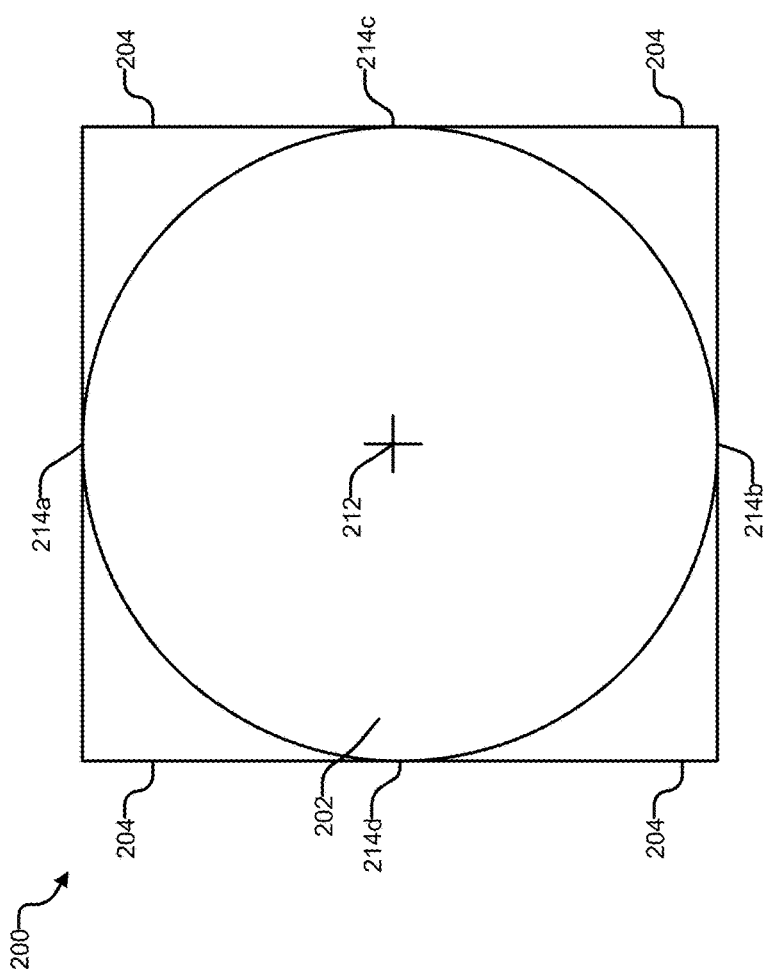

FIG. 2A and FIG. 2B illustrate an example application of the techniques discussed herein. The example of FIG. 2A illustrates an image 200 that can be captured by an omni-directional camera. As discussed above, the image 200 is rectangular in shape, where the rectangular shape corresponds to the size and shape of the camera's image capture sensor. The image 200 includes a circular region 202 that includes pixels that capture a scene. The corners 204 of the image 200, where no pixels were captured, can be left blank or can include black pixels (e.g., with a pixel value of 0 or 255).

The pixels captured in the circular region 202 include a certain field of view, where the field of view is dictated by the lens and/or camera. For example, the circular region 202 can include a 90-degree field of view, a 180-degree field of view, a 270-degree field of view, or a field of view of some other degree, depending on the construction of the camera's lens, mirror(s), and/or sensor. To fit the field of view into the image 200, the pixels are warped into the circular region 202 in a linear or non-linear manner, as discussed further below.

In various implementations, the techniques described below map the pixels in the circular region 202 to a hemispherical representation 210, an example of which is illustrated in FIG. 2B. The hemispherical representation 210 can then be used to present the image 200 to a viewer using a virtual reality rendering device. The hemispherical representation 210 can be half of a sphere (which represents 180 degrees of view), less than half of a sphere (e.g., when the image 200 captures less than 180 degrees of view), or greater than half of a sphere (e.g., when the image 200 captures more than 180 degrees of view).

In various implementations, the techniques discussed below have the effect of stretching the pixels in the circular region 202 into a hemispherical shape. For example, the center 202 of the circular region 202 can correspond to the center 222 or apex of the hemispherical representation 210. As a further example, the top-most point 214a of the circular region 202 can correspond to the top-most point 224a (e.g. polar north) of the hemispherical representation 210, and the bottom-most point 214b of the circular region 202 can correspond to the bottom-most point 224b (e.g. polar south) of the hemispherical representation 210. Similarly, the far right 214c and far left 214d of the circular region 202 can correspond to what in this example are the far right 224c of the hemispherical representation 210 and the not-visible far-left 224d. The pixels in between the center 212 and edges of the circular region 202 can further be evenly distributed over the surface of the hemispherical representation 210.

Figure 3:
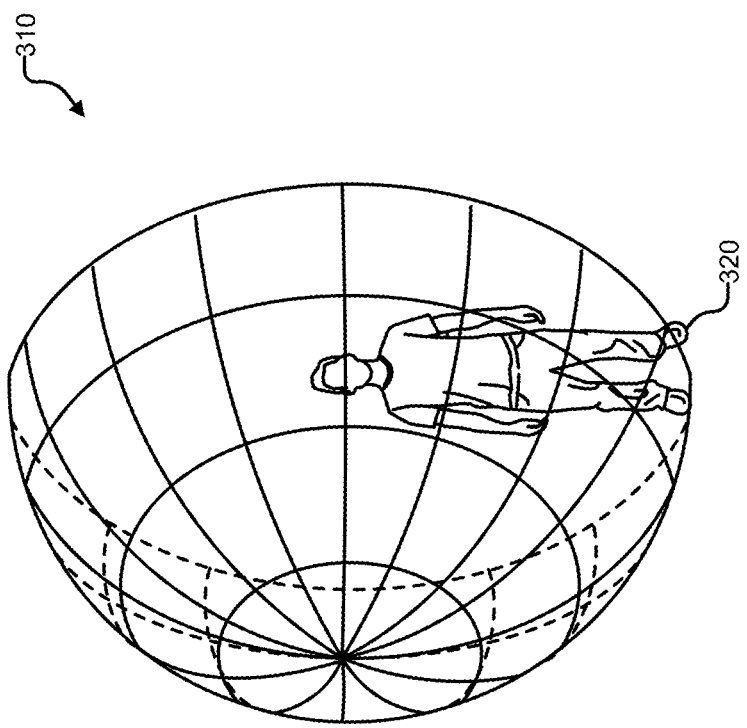
FIG. 3 illustrates an example usage of a hemispherical representation.

The resulting hemispherical representation 210 can be used to present the flat image 200 in a 360-degree display. FIG. 3 illustrates an example usage of a hemispherical representation 310. Using a 360-degree display device, the hemispherical representation 310 can be rendered such that a viewer 320 is given the impression that he is inside of the scene represented by the pixels captured by the hemispherical representation 310. In some cases, the apex of the hemispherical representation 310 can be oriented to be in the center of the viewer's field of view. In various implementations, an additional hemispherical representation can be provided for the view that would be behind the viewer 320.

There are various types of fisheye lenses, each of which maps a wide-angle field of view to an image plane in a different way. One example is an angular fisheye lens, which is also called an f-theta lens. With an angular fisheye lens, the distance from the center of the image is proportional to the angle from the camera view direction. As a result, the resolution is approximately equal across the whole image. An angular fisheye lens can be used for angles all the way to a full 360 degrees.

Figure 4:
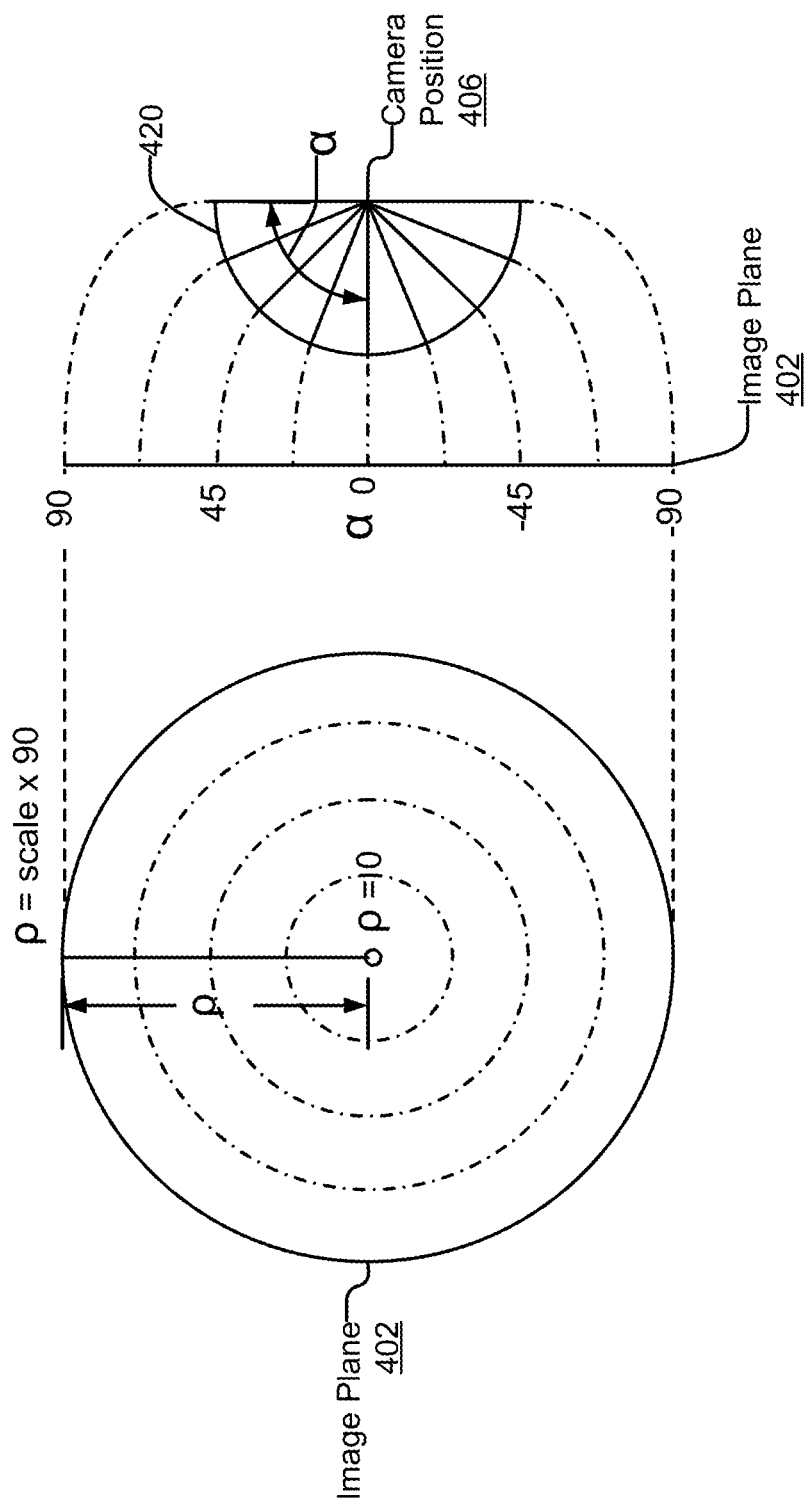
FIG. 4 illustrates an example of a cross section of a 180-degree angular fisheye lens, and a corresponding image plane for the lens.

FIG. 4 illustrates an example of a cross section of a 180-degree angular fisheye lens 420, and a corresponding image plane 402 for the lens 420. The illustration depicts the lens 420 as viewed from the side, perpendicular to the lens's image plane 402. The illustrated view can also be a top view of the lens 420, or a view from any other angle that is perpendicular the image plane 402 of the lens, though for purposes of this example it will be assumed that FIG. 4 illustrates a side view. Illustrated on the left side of FIG. 4 is a front view of the lens's image plane 402.

The construction of an angular lens is such that, for any angle from zero, where zero is the center of the lens 420 (which also considered the camera position 406), the point in space that is captured at that angle corresponds linearly to a point ρ in the image plane 402. That is, at, for example, α=45 degrees from zero, the light entering the lens 420 will be captured at a point halfway between the center of the image plane 402 and the top of the image plane 402. The top of the image plane 402 corresponds to α=90 degrees times a scaling or magnification factor. Similarly, at α=22.5 degrees from zero, light entering the lens will be captured in the image plane 402 halfway between ρ=zero and the pixels captured as 45 degrees, and at 67.5 degrees from zero, light will be captured in the image plane 402 halfway between 45 degrees and the top of the image plane 402. Because it is assumed in this example that the lens 420 is being viewed from the side, the distance of ρ from center of the image plane 402 will change only in the vertical direction.

The image plane 402 generated by the example lens 420 of FIG. 4 can be mapped to a half sphere, where the half sphere can be represented in a computing device using a 3-dimensional mesh. For example, the circular image from the image plane 402 can be rendered using a graphics processing unit (GPU). Mapping the image to a half sphere can rectify the natural distortion that the lens 420 produces. Techniques for this mapping are discussed further below.

Figure 5:
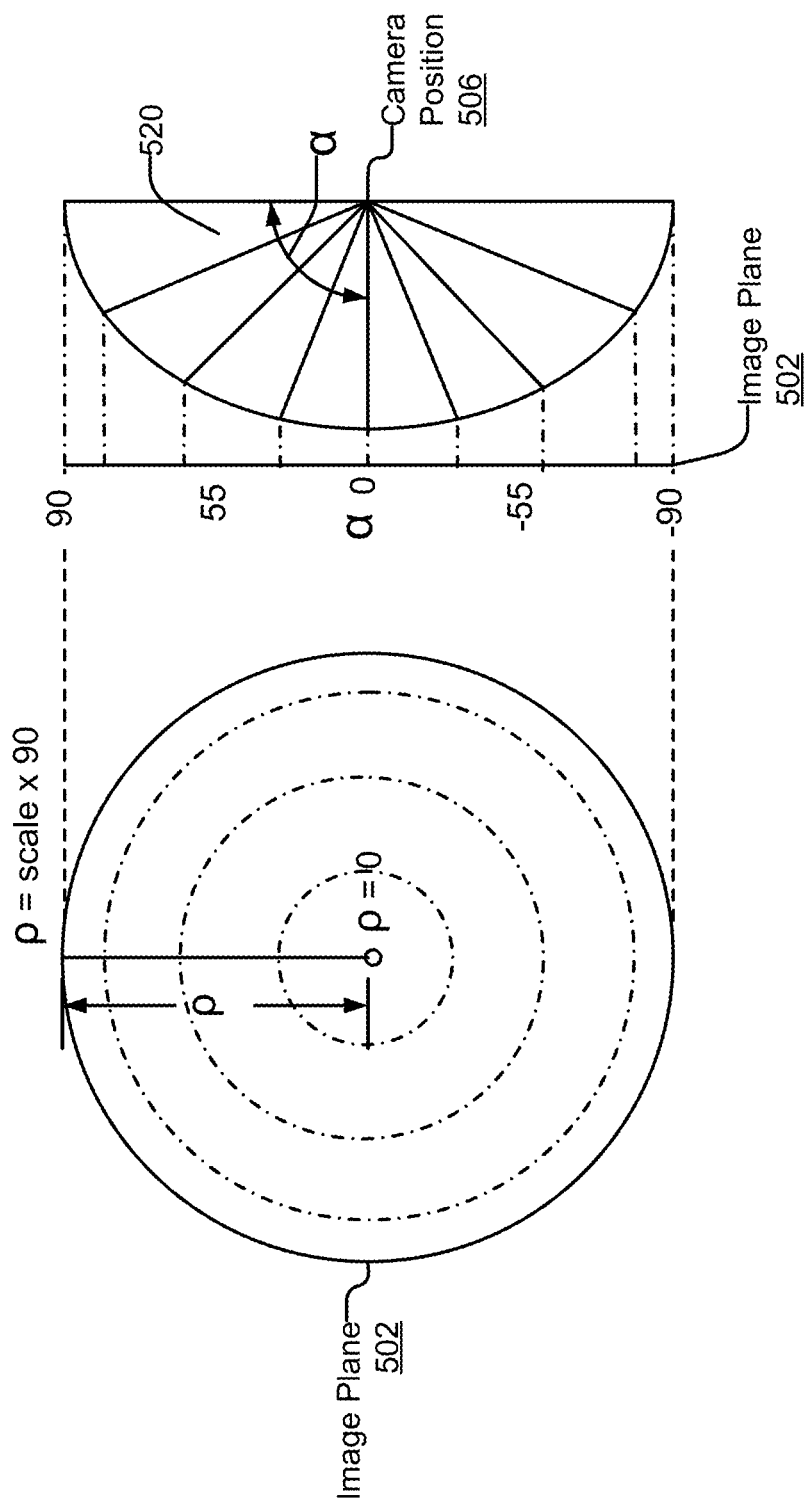
FIG. 5 illustrates an example of a hemispherical fisheye lens, and a corresponding image plane for the hemispherical fisheye lens.

Other types of fisheye lenses produce non-linear distortion from the center of the lens to the outside edge of the image. FIG. 5 illustrates an example of a hemispherical fisheye lens 520. A side view of the lens 520 is illustrated on the right side of the figure, and a front view of the image plane 502 for the lens is illustrated on the left side of the figure.

A hemispherical lens produces a parallel projection of a hemisphere onto the image plane 502. In this and other examples, the image becomes radially compressed, with more compression occurring towards the outer edges of the lens. That is, as angle α increases from zero, where zero is the center of the lens 520 (which is also considered the camera position 506), the image captured in the image plane 502 becomes increasingly compressed, in a non-linear fashion. Images captured by these types of lenses require that the non-linearity of the distortion be corrected.

In various implementations, the techniques discussed below can be used to correct the non-linear distortion that a fisheye projection can introduce into a captured image. In various implementations, these techniques include using an omnidirectional camera calibration technique, which employs a polynomial model. An omnidirectional camera calibration technique is discussed in Davide Scaramuzza et al., "A Flexible Technique for Accurate Omnidirectional Camera Calibration and Structure from Motion," which is incorporated herein by reference in its entirety. Once an omnidirectional camera (including catadioptric and dioptric cameras) has been calibrated according to this technique, a point in the real world can be determined for each pixel captured by the camera's sensor.

Figure 6B:
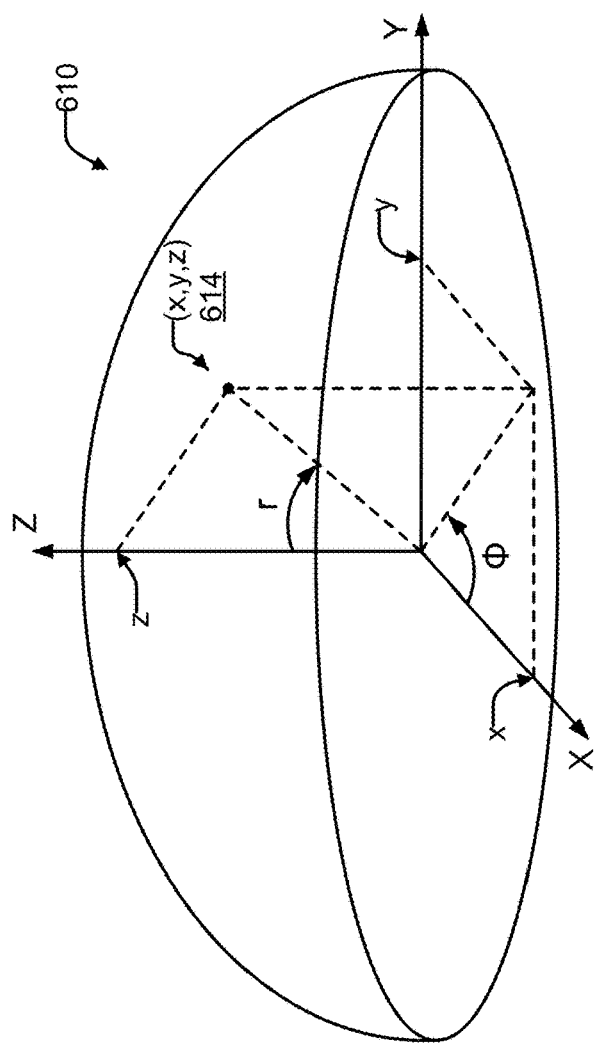
FIG. 6B illustrates an example of a hemispherical representation to which the scene captured in the image of FIG. 6A is to be mapped.
Figure 6A:
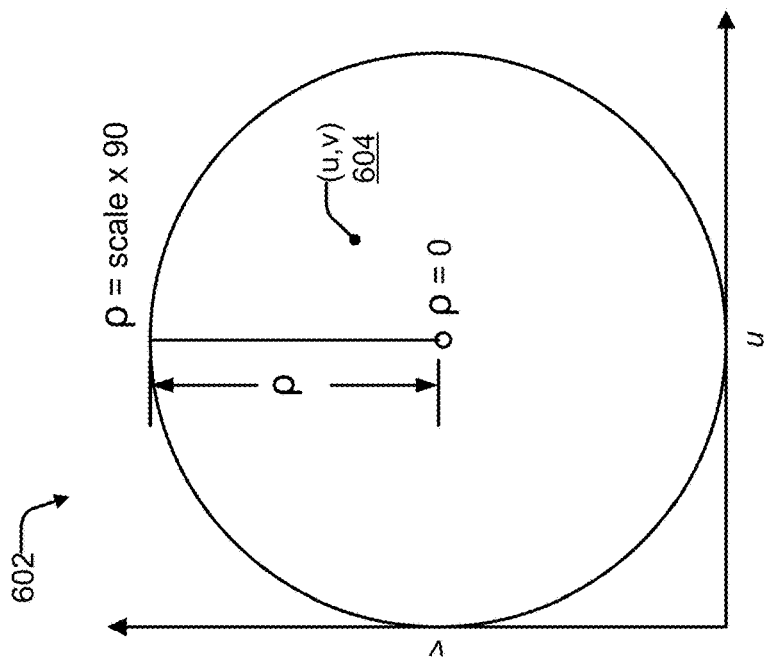
FIG. 6A illustrates an example of an image that can be captured by an omnidirectional camera.

FIG. 6A illustrates an example of an image 602 that can be captured by an omnidirectional camera. As discussed above, the image 602 can have a fisheye distortion, where the scene captured in the image has been warped into a circular shape. For purposes of mapping the image 602 to a hemispherical representation 610, the horizontal axis of the image has been labeled u and the vertical axis has been labeled v. For both the horizontal and the vertical dimensions, zero is located at the center of the image 602. In this example, p is defined as a point along the radius of the circle formed by the image 602. Such a point 604 can have coordinates (u, v).

FIG. 6B illustrates an example of a hemispherical representation 610 to which the scene captured in the image 602 is to be mapped. For purposes of this mapping, orthogonal X and Y axes have been defined. In various implementations, the X axis can correspond, for example, to up-and-down in the real world, and the Y axis can correspond to left and right. The Z axis has been defined as perpendicular to the camera's image sensor. A point 614 on the surface of the hemispherical representation 610 can be described using the coordinates (x, y, z). The point 614 can also have a corresponding angular value 1 that describes the point's rotation between the X and Y axis. The point 614 can also have an angular value r, which describes the point's rotation between the Z axis and the plane formed by the X and Y axis.

In various implementations, the omnidirectional camera calibration method, noted above, uses the following polynomial to relate the position (u, v) of a point 604 in the image 602 to a point 614 relative to the sensor axis (that is, relative to the Z axis illustrated in FIG. 6B):

$$f(\rho) = a_0 + a_1\rho + a_2\rho^2 + \ldots + a_N\rho^N$$

In the above equation, the coefficients $a_i$ (i=0, 1, 2, ... N), and the polynomial degree N are model parameters determined by the calibration, and ρ, as discussed above, is a distance from the sensor axis, which may be referred to as a radial value.

Camera calibration generally involves determining the intrinsic and extrinsic parameters for a particular camera. A camera's intrinsic parameters include the camera's focal length and optical center. In the above equation, the coefficients $a_i$ are intrinsic parameters that describe the shape of the image 602. The extrinsic parameters can include degrees of rotation (e.g., pitch, yaw, and/or roll) with respect to the ground, and the camera's 3-dimensional real-world location (referred to as the camera's "translation."). The extrinsic parameters are generally measured from the center of the camera's sensor. Camera calibration generally involves determining the camera's intrinsic and extrinsic parameters. In various implementations, this can be accomplished in an automated fashion, and/or with the assistance of images that capture calibration patterns.

The function $f(\rho)$ above assumes that the image 602 is rotationally uniform, meaning that, for a given distance from the center of the image 602, all points in the image 602 at that distance capture points in space that are equidistant from the camera sensor. This is a reasonable assumption, since camera lenses are typically manufactured to be precisely symmetric. The function can thus be used to map the circular fisheye image 602 onto a hemispherical representation 610. As noted above, the function relates coordinates in the image 602 to corresponding points relative to the Z axis of the hemispherical representation 610. Thus, for any point 614 on the hemispherical representation 610, the function can be used to find the corresponding point 604 in the image 602. A pixel can then be taken from the point 604 in the image 602, and be placed in the hemispherical representation 610 at the corresponding point 614.

When the image 602 in FIG. 6A includes linear distortion (such as described in the example of FIG. 4) for a point 614 in the hemispherical representation 610 (having coordinates (x, y, z) with rotational coordinates (r, Φ)), a corresponding point 604 (having coordinates (u, v) in the image plane 602) can be determined using the following equations:

$$u = \frac{r\cos\Phi + 1.0}{2.0}$$

$$v = \frac{(r\sin\Phi + 1.0)}{2.0}$$

In the above equations, u and v are normalized, meaning that u and v each vary between 0 and 1.

The rotational coordinates (r, Φ) can be determined using a function, a tan 2. The a tan 2 function is the arctangent function with two arguments. for any real number arguments x and y not both equal to zero, a tan 2(y, x) returns the angle, in radians, between the positive x-axis of a plane and the point on the plane given by the coordinates (x, y). The angle is positive for counter-clockwise angles (e.g., the upper half of the plane, where y>0), and negative for clockwise angels (e.g., the lower half of the plane, where y<0). Using a tan 2, the r and Φ can be computed as follows:

$$r = \frac{\mathrm{atan2}(\sqrt{x^2 + y^2}, z)}{\pi/2}$$

$$\Phi = \mathrm{atan2}(y, x)$$

In the above equations, r will range from 0 to 1, and Φ will range from 0 to 2π.

Using the above equations, pixels from the image 602 can be mapped to the hemispherical representation 610. Specifically, for a given point 614 having coordinates (x, y, z), the corresponding point 604, having coordinates (u, v), in the image 602 can be computed. A pixel can then be taken from the point 604 in the image 602 and be placed in the hemispherical representation at (x, y, z).

When the image 602 includes non-linear distortion (such as described in the example of FIG. 5), the following additional and/or alternate computations can be used to map the image 602 (as illustrated in FIG. 6A) to a hemispherical representation 610. These equations can correct for the non-linear distortion. In the following discussion, for points in an image 602 that include non-linear distortion, u' and v', which may be referred to as corrected normalized coordinates, will be used to describe the coordinates for these points.

As noted above, the distance ρ from the center of the image 602 varies non-linearly. The value of ρ can be expressed as:

$$\rho = k_0 r$$

In the above equation, angular value r can be computed as described above.

The function $f(\rho)$ can further be modified as follows:

$$f(\rho) = k_1(a_0 + a_1\rho + a_2\rho^2 + \ldots + a_N\rho^N)$$

In the above two equations, $k_0$ and $k_1$ are scaling parameters, and $a_i$ are the coefficients determine by the camera calibration, as discussed above. The function $f(\rho)$ provides a projection of the point 614, having coordinates (x, y, z), onto the sensor axis, Z. The result of the function $f(\rho)$ thus provides the z-coordinate.

The parameter $k_0$ scales r into ρ; that is, $k_0$ adjusts r according to the non-linear variation of ρ. The parameter $k_0$ can thus be used to adjust the polynomial equation for non-linear compression in a fisheye image, such as is discussed above with respect to FIG. 5. A value for the parameter $k_0$ can be derived from r and the function $f(\rho)$. Specifically, $k_0$ can be determined such that, when r=1, then $f(\rho)=0$. As illustrated in FIG. 6B, r=1 is the extreme edge of the hemispherical representation 610, to which the image 602 is being mapped. At the edge of the hemispherical representation 610, the z coordinate is zero, hence $f(\rho)$ (which provides the z-coordinate) is also zero.

The parameter $k_1$ scales $f(\rho)$ into z. The camera calibration method used to derive the function $f(\rho)$ assumes a hemispherical projection where $f(\rho)<0$. Hence, $k_1$ can be set to a negative value, such as −1, so that $f(\rho)$ produces positive values. Alternatively, the sign of the coefficients $a_i$ can be changed. Alternatively, in some cases the sign change may be included in the formulas discussed below.

The coordinates for a point (u', v') in the image plane 602 can be determined using the following equations:

$$u' = \frac{r'\cos\Phi + 1.0}{2.0}$$

$$v' = \frac{r'\sin\Phi + 1.0}{2.0}$$

In the above equations, u' and v' are normalized, and vary between 0 and 1.

For the above equations, r' can be computed as follows:

$$r' = \frac{2r - \mathrm{atan2}(\rho, f(\rho))}{\pi/2}$$

Using the above equations, radial distortion—where the image 602 experiences more and more compression as the distance from the center of the image increases—can be corrected when the image is mapped to the hemispherical representation 610. Specifically, for a point 614 (x, y, z) on the hemispherical representation 610, a point with coordinates (u', v') in the image can be determined. A pixel from the point (u', v') can then be placed at the point 614 (x, y, z).

In some cases, an additional scaling factor may be needed. For example, when the image includes a field of view that is greater than or less than 180 degrees and/or a portion of the field of view has been cropped, scaling factors α and β can be introduced to accommodate the field of view and/or cropping (for an example of a cropped fisheye image, see FIG. 1). When the field of view is symmetric, such as, for example, 220 degrees in all directions, then α and β can be the same (e.g., both equal to 180/220). When the field of view is asymmetric, α and/or β can be set to values that accommodate the asymmetry. For example, in the example of FIG. 1, assuming that the field of view is 180 degrees, β can be set to 1, and a can be set to 180/n, where n is the distance from the center of image to the cropped upper or lower edge of the frame.

With α and β, the equations for determining a point in the image 602, expressed as (u ", v"), can be determined using the following equations:

$$u'' = \frac{\alpha r'\cos\Phi + 1.0}{2.0}$$

$$v'' = \frac{\beta r'\sin\Phi + 1.0}{2.0}$$

In the above equations, r' can be determined as discussed above.

FIG. 7A and FIG. 7B illustrate examples of an image rendered with and without correction. In the example of FIG. 7A, the image 702 is rendered as captured by an omnidirectional camera, without any correction for distortions caused by the camera. As illustrated by this example, the image 702 is warped, such that the building and paths in the scene bend towards a vanishing point, instead of being straight.

In the example of FIG. 7B, the image 710 is rendered with using the techniques discussed above. In this example image 710, the edges of building and paths in front of the building are straight, as they would appear in the real world. The example image 710 is illustrated here as 2-dimensional and rectangular in shape for clarity and ease of understanding. The example image 710 was rendered into a 3-dimensional, hemispherical representation, as illustrated above, and obtained the corrections illustrated here.

In various implementations, some or all of the parameters associated with the polynomial model discussed above can be conveyed with image data captured using an omnidirectional camera. These parameters include the polynomial coefficients $a_i$ (i=0, 1, 2, ... N), the polynomial order N, the scaling parameters $k_0$, $k_1$, and/or the scaling parameters α and β, among others. When included with the video data, these parameters can then be used to render fisheye images in the video frames into a hemispherical representation, for a 360-degree video presentation. In some implementations, the parameters can be used at the video capture device to map the 2-dimensional images captured by the camera to a 3-dimensional representation. The 3-dimensional representation can then be encoded for storage and/or transmission.

In some implementations, the 2-dimensional images can be encoded for storage and/or transmission, and a receiver device can decode the images and use the parameters to render the images for a 360-degree video presentation.

Various methods can be used to convey the model parameters. For example, the parameters can be included in a video bitstream, using syntactical structures of the bitstream. For example, the parameters can be included in one or more a supplemental enhancement information (SEI) messages. As another example, the parameters can be incorporated into the file format used to store a 360-degree video. As another example, the parameters can be incorporated into special network protocol extensions.

In various implementations, alternatives to the polynomial model discussed above can be used to achieve the same result. For example, approximations of the polynomial model, such as a piecewise linear model, can also be used, using alternative parameters.

FIG. 8 is a flowchart illustrating an example of a process 800 for mapping a 2-dimensional fisheye image to a 3-dimensional, hemispherical representation for display in a 360-degree video presentation. At 802, the process 800 includes obtaining 2-dimensional video data captured by an omnidirectional camera, wherein the 2-dimensional video data includes an image of a scene, and wherein, in the image, the scene has been warped into a circular region of the image. In some implementations, the warping may be radially linear; that is, the image warps uniformly from the center of the circular region to the outside edge. In some cases, the warping may be non-linear, such that the image includes more compression towards the outside edge of the circular region than is present at the center.

In some implementations, the video data is obtained from an encoded bitstream. In these implementations, the encoded bitstream can include parameters that describe the warping of the image. These parameters can include, for example, a polynomial order, a polynomial coefficient, a polynomial scaling parameter, or a mapping scaling parameter, among others. In some implementations, the parameters can be obtained from an SEI message in the encoded bitstream. In some implementations, the parameters can be included in a file that contains the encoded bitstream. In these implementations, the file can include data structures for storing the parameters.

At 804, the process 800 includes mapping the image to a 3-dimensional hemispherical representation, wherein mapping the image includes mapping pixels in the circular region of the image to corresponding locations on the 3-dimensional hemispherical representation, wherein mapping the image corrects the warping of the scene. In some implementations, mapping the image includes using a polynomial equation to project a point in the image to a corresponding point on the 3-dimensional hemispherical representation. The point in the image can provide a pixel to map to the point on the 3-dimensional hemispherical representation.

In some implementations, the warping of the image into the circular region may be non-linear. In these implementations, the mapping the image to the 3-dimensional hemispherical representation can include determining coordinates for a pixel in the 2-dimensional image using an adjusted radial value. The adjusted radial value can correspond to the non-linearity of the warping. For example, the adjusted radial value increases non-linearly from the center of the image to the outside edge. The coordinates determined using the adjusted radial value can then be used to map a pixel from the image to the hemispherical representation.

In some implementations, the image includes a field of view that is greater than 180 degrees. In these implementations, the process 800 further includes adjusting coordinates for a pixel in the 2-dimensional image using a radial value that has been scaled according to the field of view. The coordinates can then be used to map a pixel from the image to the hemispherical representation. In some implementations, the image includes a field of view of 180 degrees or less.

At 806, the process includes using the 3-dimensional hemispherical representation in a 360-degree video presentation. For example, the 3-dimensional hemispherical representation can be rendered for display by a video display device. Alternatively or additionally, the 3-dimensional hemispherical representation can be encoded for storage and/or transmission, where the encoded data can be later decoded and displayed.

In some implementations, the process 800 can be implemented in a mobile device, such as a smart phone, tablet computer, laptop computer, personal digital assistant, or any other kind of computing device that can connect wireless to a network and/or that are small and light enough to be easily transported. In these implementations, the mobile device can include an omnidirectional camera for capturing 360-degree video. In some implementations, the mobile device can include a display for displaying 360-degree video.

In some examples, the process 800 may be performed by a computing device or an apparatus, such as the system discussed below with respect to FIG. 9. For example, the process 800 can be performed by the system 900 and/or the storage 908 or output 910 shown in FIG. 9. In some cases, the computing device or apparatus may include a processor, microprocessor, microcomputer, or other component of a device that is configured to carry out the steps of process 800 of FIG. 8. In some examples, the computing device or apparatus may include a camera configured to capture video data (e.g., a video sequence) including video frames. For example, the computing device may include a camera device (e.g., an omni-directional camera, or other type of camera device) that may include a video codec. In some examples, a camera or other capture device that captures the video data is separate from the computing device, in which case the computing device receives the captured video data. The computing device may further include a network interface configured to communicate the video data. The network interface may be configured to communicate Internet Protocol (IP) based data or any other suitable type of data.

Process 800 is illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 800 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 9:
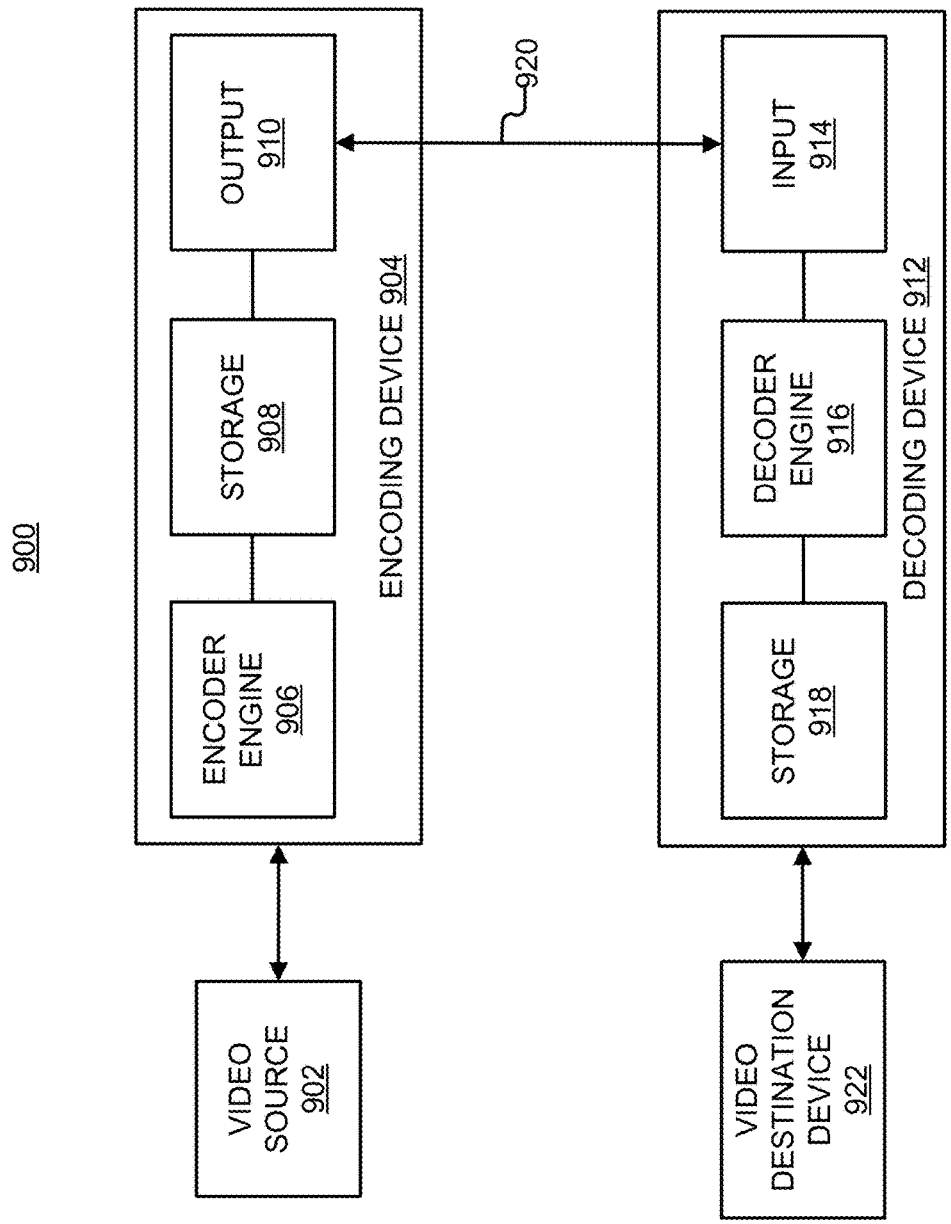
FIG. 9 is a block diagram illustrating an example of a system including an encoding device and a decoding device.

FIG. 9 is a block diagram illustrating an example of a system 900 including an encoding device 904 and a decoding device 912. The encoding device 904 may be part of a source device, and the decoding device 912 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, or any other suitable electronic device. In some examples, the source device and the receiving device may include one or more wireless transceivers for wireless communications. The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. In some examples, system 900 can support one-way or two-way video transmission to support applications such as video conferencing, video streaming, video playback, video broadcasting, gaming, and/or video telephony.

The encoding device 904 (or encoder) can be used to encode video data, including virtual reality video data, using a video coding standard or protocol to generate an encoded video bitstream. Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its scalable video coding and multiview video coding extensions, known as SVC and MVC, respectively. A more recent video coding standard, High-Efficiency Video Coding (HEVC), has been finalized by the Joint Collaboration Team on Video Coding (JCT-VC) of ITU-T Video Coding Experts Group (VCEG) and ISO/IEC Moving Picture Experts Group (MPEG). Various extensions to HEVC deal with multi-layer video coding and are also being developed by the JCT-VC, including the multiview extension to HEVC, called MV-HEVC, and the scalable extension to HEVC, called SHVC, or any other suitable coding protocol.

Implementations described herein describe examples using the HEVC standard, or extensions thereof. However, the techniques and systems described herein may also be applicable to other coding standards, such as AVC, MPEG, extensions thereof, or other suitable coding standards already available or not yet available or developed. Accordingly, while the techniques and systems described herein may be described with reference to a particular video coding standard, one of ordinary skill in the art will appreciate that the description should not be interpreted to apply only to that particular standard.

A video source 902 may provide the video data to the encoding device 904. The video source 902 may be part of the source device, or may be part of a device other than the source device. The video source 902 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source. One example of a video source 902 can include an Internet protocol camera (IP camera). An IP camera is a type of digital video camera that can be used for surveillance, home security, or other suitable application. Unlike analog closed circuit television (CCTV) cameras, an IP camera can send and receive data via a computer network and the Internet.

The video data from the video source 902 may include one or more input pictures or frames. A picture or frame is a still image that is part of a video. The encoder engine 906 (or encoder) of the encoding device 904 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a RASL flag (e.g., NoRaslOutputFlag) equal to 1. Otherwise, a random access point picture (with RASL flag equal to 0) does not start a CVS. An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Two classes of NAL units exist in the HEVC standard, including video coding layer (VCL) NAL units and non-VCL NAL units. A VCL NAL unit includes one slice or slice segment (described below) of coded picture data, and a non-VCL NAL unit includes control information that relates to one or more coded pictures.

NAL units may contain a sequence of bits forming a coded representation of the video data (e.g., an encoded video bitstream, a CVS of a bitstream, or the like), such as coded representations of pictures in a video. The encoder engine 906 generates coded representations of pictures by partitioning each picture into multiple slices. The slices are then partitioned into coding tree blocks (CTBs) of luma samples and chroma samples. A CTB of luma samples and one or more CTBs of chroma samples, along with syntax for the samples, are referred to as a coding tree unit (CTU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma or a chroma component that uses the same motion parameters for inter-prediction. The luma PB and one or more chroma PBs, together with associated syntax, form a prediction unit (PU). A set of motion parameters is signaled in the bitstream for each PU and is used for inter-prediction of the luma PB and the one or more chroma PBs. A CB can also be partitioned into one or more transform blocks (TBs). A TB represents a square block of samples of a color component on which the same two-dimensional transform is applied for coding a prediction residual signal. A transform unit (TU) represents the TBs of luma and chroma samples, and corresponding syntax elements.

A size of a CU corresponds to a size of the coding node and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some embodiments, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoder engine 906.

Once the pictures of the video data are partitioned into CUs, the encoder engine 906 predicts each PU using a prediction mode. The prediction is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Using inter-prediction, each PU is predicted using motion compensation prediction from image data in one or more reference pictures (before or after the current picture in output order). The decision whether to code a picture area using inter-picture or intra-picture prediction may be made, for example, at the CU level. In some examples, the one or more slices of a picture are assigned a slice type. Slice types include an I slice, a P slice, and a B slice. An I slice (intra-frames, independently decodable) is a slice of a picture that is only coded by intra-prediction, and therefore is independently decodable since the I slice requires only the data within the frame to predict any block of the slice. A P slice (uni-directional predicted frames) is a slice of a picture that may be coded with intra-prediction and uni-directional inter-prediction. Each block within a P slice is either coded with intra-prediction or inter-prediction. When the inter-prediction applies, the block is only predicted by one reference picture, and therefore reference samples are only from one reference region of one frame. A B slice (bi-directional predictive frames) is a slice of a picture that may be coded with intra-prediction and inter-prediction. A block of a B slice may be bi-directional predicted from two reference pictures, where each picture contributes one reference region and sample sets of the two reference regions are weighted (e.g., with equal weights) to produce the prediction signal of the bi-directional predicted block. As explained above, slices of one picture are independently coded. In some cases, a picture can be coded as just one slice.

A PU may include data related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

The encoding device 904 may then perform transformation and quantization. For example, following prediction, the encoder engine 906 may calculate residual values corresponding to the PU. Residual values may comprise pixel difference values. Any residual data that may be remaining after prediction is performed is transformed using a block transform, which may be based on discrete cosine transform, discrete sine transform, an integer transform, a wavelet transform, or other suitable transform function. In some cases, one or more block transforms (e.g., sizes 32×32, 16×16, 8×8, 4×4, or the like) may be applied to residual data in each CU. In some embodiments, a TU may be used for the transform and quantization processes implemented by the encoder engine 906. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some embodiments following intra-predictive or inter-predictive coding using PUs of a CU, the encoder engine 906 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. Encoder engine 906 may form the TUs including the residual data for the CU, and may then transform the TUs to produce transform coefficients for the CU.

The encoder engine 906 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, or the like), partitioning information, and any other suitable data, such as other syntax data. The different elements of the coded video bitstream may then be entropy encoded by the encoder engine 906. In some examples, the encoder engine 906 may utilize a predefined scan order to scan the quantized transform coefficients to produce a serialized vector that can be entropy encoded. In some examples, encoder engine 906 may perform an adaptive scan. After scanning the quantized transform coefficients to form a vector (e.g., a one-dimensional vector), the encoder engine 906 may entropy encode the vector. For example, the encoder engine 906 may use context adaptive variable length coding, context adaptive binary arithmetic coding, syntax-based context-adaptive binary arithmetic coding, probability interval partitioning entropy coding, or another suitable entropy encoding technique.

The output 910 of the encoding device 904 may send the NAL units making up the encoded video bitstream data over the communications link 920 to the decoding device 912 of the receiving device. The input 914 of the decoding device 912 may receive the NAL units. The communications link 920 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 904 may store encoded video bitstream data in storage 908. The output 910 may retrieve the encoded video bitstream data from the encoder engine 906 or from the storage 908. Storage 908 may include any of a variety of distributed or locally accessed data storage media. For example, the storage 908 may include a hard drive, a storage disc, flash memory, volatile or non-volatile memory, or any other suitable digital storage media for storing encoded video data.

The input 914 of the decoding device 912 receives the encoded video bitstream data and may provide the video bitstream data to the decoder engine 916, or to storage 918 for later use by the decoder engine 916. The decoder engine 916 may decode the encoded video bitstream data by entropy decoding (e.g., using an entropy decoder) and extracting the elements of one or more coded video sequences making up the encoded video data. The decoder engine 916 may then rescale and perform an inverse transform on the encoded video bitstream data. Residual data is then passed to a prediction stage of the decoder engine 916. The decoder engine 916 then predicts a block of pixels (e.g., a PU). In some examples, the prediction is added to the output of the inverse transform (the residual data).

The decoding device 912 may output the decoded video to a video destination device 922, which may include a display or other output device for displaying the decoded video data to a consumer of the content. In some aspects, the video destination device 922 may be part of the receiving device that includes the decoding device 912. In some aspects, the video destination device 922 may be part of a separate device other than the receiving device.

Supplemental Enhancement Information (SEI) messages can be included in video bitstreams. For example, SEI messages may be used to carry information (e.g., metadata) that is not essential in order to decode the bitstream by the decoding device 912. This information is useful in improving the display or processing of the decoded output (e.g. such information could be used by decoder-side entities to improve the viewability of the content).

In some embodiments, the video encoding device 904 and/or the video decoding device 912 may be integrated with an audio encoding device and audio decoding device, respectively. The video encoding device 904 and/or the video decoding device 912 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 904 and the video decoding device 912 may be integrated as part of a combined encoder/decoder (codec) in a respective device.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers can represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard. In general, a layer includes a set of VCL NAL units and a corresponding set of non-VCL NAL units. The NAL units are assigned a particular layer ID value. Layers can be hierarchical in the sense that a layer may depend on a lower layer.

In general, a layer includes a set of VCL NAL units and a corresponding set of non-VCL NAL units. The NAL units are assigned a particular layer ID value. Layers can be hierarchical in the sense that a layer may depend on a lower layer. A layer set refers to a set of layers represented within a bitstream that are self-contained, meaning that the layers within a layer set can depend on other layers in the layer set in the decoding process, but do not depend on any other layers for decoding. Accordingly, the layers in a layer set can form an independent bitstream that can represent video content. The set of layers in a layer set may be obtained from another bitstream by operation of a sub-bitstream extraction process. A layer set may correspond to the set of layers that is to be decoded when a decoder wants to operate according to certain parameters.

The video data captured by a camera (e.g., a fisheye camera or other omnidirectional camera) can be coded to reduce the amount of data needed for transmission and storage. Coding techniques may be implemented in an example video encoding and decoding system (e.g., system 900). In some examples, a system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

Figure 10:
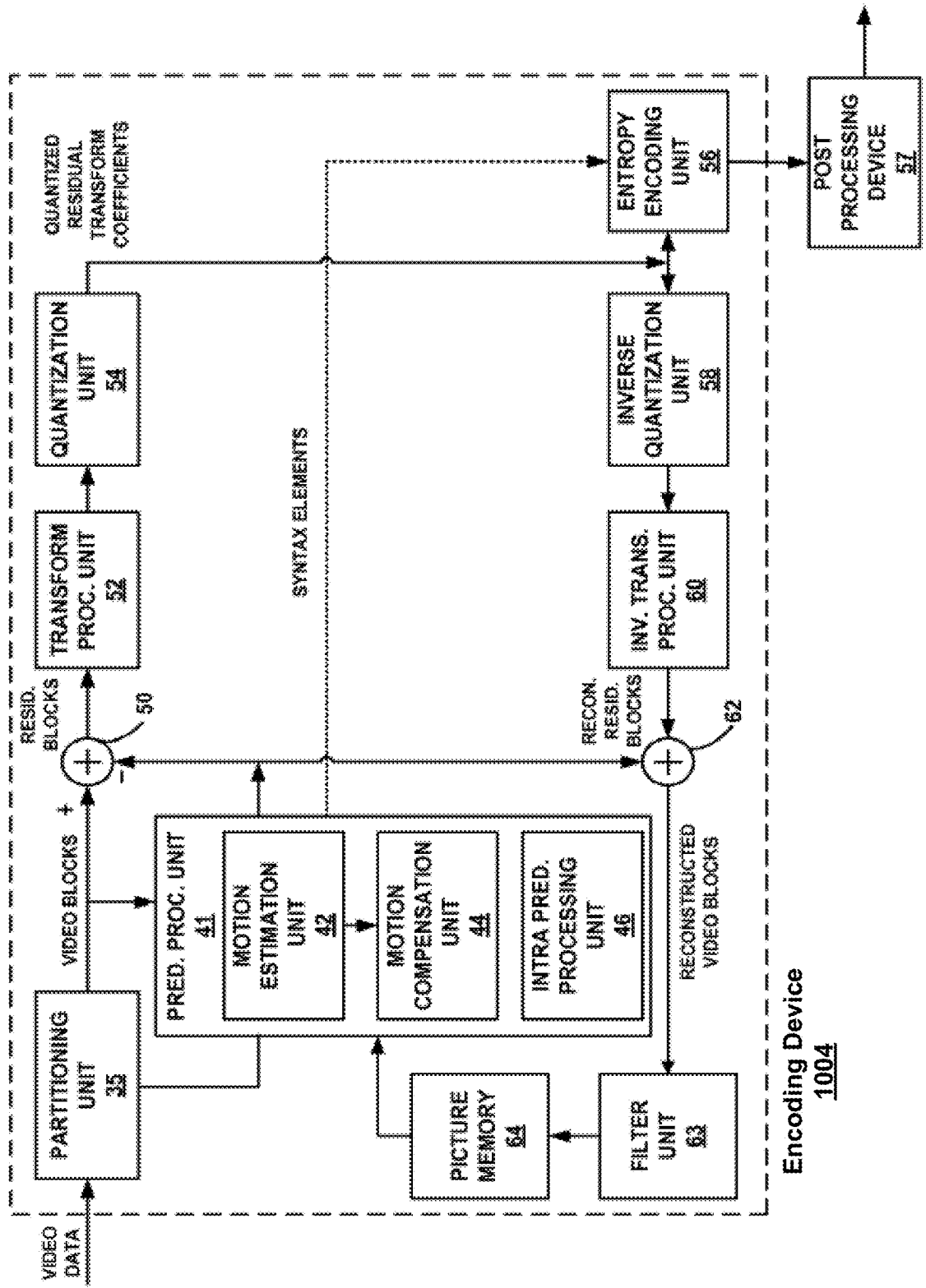
FIG. 10 is a block diagram illustrating an example encoding device.
Figure 11:
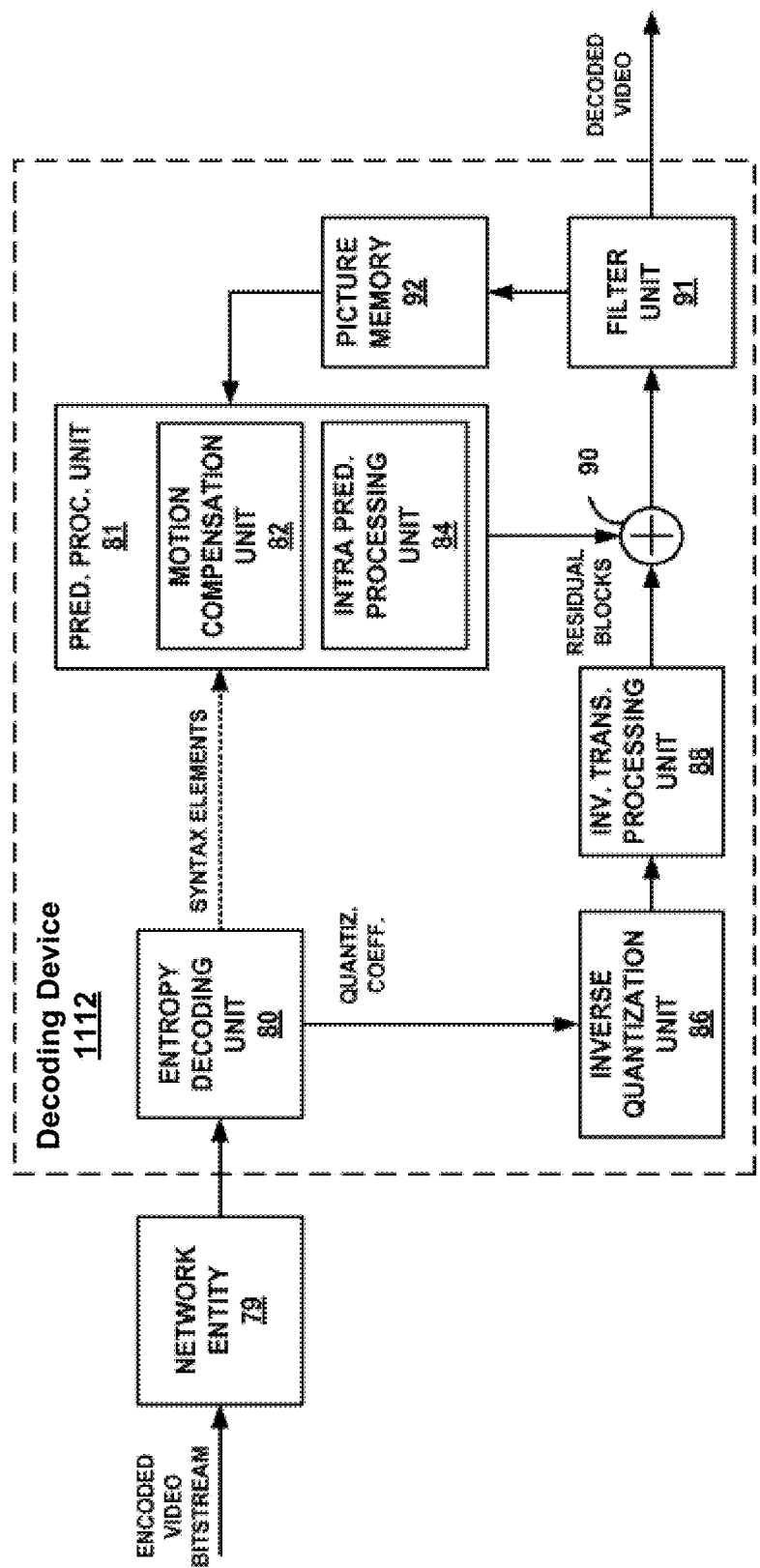
FIG. 11 is a block diagram illustrating an example decoding device.

Specific details of the encoding device 1004 and the decoding device 1112 are shown in FIG. 10 and FIG. 11, respectively. FIG. 10 is a block diagram illustrating an example encoding device 1004 that may implement one or more of the techniques described in this disclosure. Encoding device 1004 may, for example, generate the syntax structures described herein (e.g., the syntax structures of a VPS, SPS, PPS, or other syntax elements). Encoding device 1004 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 1004 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 1004 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 10 as being an in loop filter, in other configurations, filter unit 63 may be implemented as a post loop filter. A post processing device 57 may perform additional processing on encoded video data generated by encoding device 1004. The techniques of this disclosure may in some instances be implemented by encoding device 1004. In other instances, however, one or more of the techniques of this disclosure may be implemented by post processing device 57.

As shown in FIG. 10, encoding device 1004 receives video data, and partitioning unit 35 partitions the data into video blocks. The partitioning may also include partitioning into slices, slice segments, tiles, or other larger units, as well as video block partitioning, e.g., according to a quadtree structure of LCUs and CUs. Encoding device 1004 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, encoding device 1004 may calculate values for sub-integer pixel positions of reference pictures stored in picture memory 64. For example, encoding device 1004 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identifies one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. Encoding device 1004 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by decoding device 1112 of FIG. 11 in decoding the video blocks of the video slice.

Intra-prediction processing unit 46 of FIG. 10 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction unit processing 46 (or mode select unit 40, in some examples) may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. Encoding device 1004 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, encoding device 1004 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce the bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to decoding device 1112, or archived for later transmission or retrieval by decoding device 1112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In this manner, encoding device 1004 of FIG. 10 represents an example of a video encoder configured to generate syntax for an encoded video bitstream. Encoding device 1004 may, for example, generate VPS, SPS, and PPS parameter sets as described above. The encoding device 1004 may perform any of the techniques described herein, including the processes described above with respect to FIG. 10 and FIG. 11. The techniques of this disclosure have generally been described with respect to encoding device 1004, but as mentioned above, some of the techniques of this disclosure may also be implemented by post processing device 57.

FIG. 11 is a block diagram illustrating an example decoding device 1112. The decoding device 1112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra-prediction processing unit 84. Decoding device 1112 may, in some examples, perform a decoding pass generally reciprocal to the encoding pass described with respect to encoding device 1004 from FIG. 10.

During the decoding process, decoding device 1112 of FIG. 11 receives an encoded video bitstream that represents video blocks of an encoded video slice and associated syntax elements sent by encoding device 1004 of FIG. 10. In some embodiments, the decoding device 1112 of FIG. 11 may receive the encoded video bitstream from the encoding device 1004. In some embodiments, the decoding device 1112 may receive the encoded video bitstream from a network entity 79, such as a server, a media-aware network element (MANE), a video editor/splicer, or other such device configured to implement one or more of the techniques described above. Network entity 79 may or may not include encoding device 1004. Some of the techniques described in this disclosure may be implemented by network entity 79 prior to network entity 79 transmitting the encoded video bitstream to decoding device 1112. In some video decoding systems, network entity 79 and decoding device 1112 may be parts of separate devices, while in other instances, the functionality described with respect to network entity 79 may be performed by the same device that comprises decoding device 1112.

The entropy decoding unit 80 of decoding device 1112 entropy decodes the bitstream to generate quantized coefficients, motion vectors, and other syntax elements. Entropy decoding unit 80 forwards the motion vectors and other syntax elements to prediction processing unit 81. Decoding device 1112 may receive the syntax elements at the video slice level and/or the video block level. Entropy decoding unit 80 may process and parse both fixed-length syntax elements and variable-length syntax elements in one or more parameter sets, such as VPS, SPS, and PPS sets.

When the video slice is coded as an intra-coded (I) slice, intra-prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. Decoding device 1112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by encoding device 1004 during encoding of the video blocks to calculate interpolated values for sub-integer pixels of reference blocks. In this case, motion compensation unit 82 may determine the interpolation filters used by encoding device 1004 from the received syntax elements, and may use the interpolation filters to produce predictive blocks.

Inverse quantization unit 86 inverse quantizes, or de-quantizes, the quantized transform coefficients provided in the bitstream and decoded by entropy decoding unit 80. The inverse quantization process may include use of a quantization parameter calculated by encoding device 1004 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, decoding device 1112 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 11 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as video destination device 922 shown in FIG. 9.

In the foregoing description, aspects of the application are described with reference to specific embodiments thereof, but those skilled in the art will recognize that the present disclosure is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may be implemented in hardware, software, firmware, or any combination thereof. Such techniques may be implemented in any of a variety of devices such as general purpose computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, perform one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

The coding techniques discussed herein may be embodied in an example video encoding and decoding system. A system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming devices, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from a source device to a destination device. In one example, a computer-readable medium may comprise a communication medium to enable a source device to transmit encoded video data directly to a destination device in real-time. The encoded video data may be modulated according to a communication standard, such as a wireless communication protocol, and transmitted to a destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, a system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source devices and destination devices are merely examples of such coding devices in which a source device generates coded video data for transmission to destination device. In some examples, the source and destination devices may operate in a substantially symmetrical manner such that each of the devices includes video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer generated video. In some cases, if a video source is a video camera, a source device and a destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted, the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the application have been described.

What is claimed is:

1. A method of processing 360-degree video data, comprising:
    obtaining two-dimensional video data captured by an omnidirectional camera, wherein the two-dimensional video data includes an image of a scene, and wherein, in the image, the scene has been warped into a circular region of the image;
    determining, for pixel locations in the circular region of the image, corresponding locations on a three-dimensional hemispherical representation of the image, wherein determining the corresponding locations includes applying a function that projects a point in the image, represented by a two-dimensional coordinate defined by a first angle in an image plane of the image and a distance from a center of the circular region of the image, to a corresponding point on the three-dimensional hemispherical representation, represented by a three-dimensional coordinate defined by a second angle in the image plane and a third angle in an orthogonal plane from the image plane;
    mapping, using the two-dimensional coordinate and the three-dimensional coordinate, a pixel in the circular region of the image to the three-dimensional hemispherical representation of the image, wherein the point in the image provides the pixel to map to the point on the three-dimensional hemispherical representation; and
    outputting the three-dimensional hemispherical representation for display in a 360-degree video presentation,
    wherein the function is a polynomial function, of degree at least 2, in the distance from the center of the circular region of the image, and wherein the function applies a parameter of the omnidirectional camera to determine the three-dimensional coordinate.

2. The method of claim 1, wherein the warping is non-linear, and further comprising:
    determining the two-dimensional coordinate using an adjusted radial value, wherein the adjusted radial value corresponds to the non-linearity of the warping.

3. The method of claim 1, wherein the image includes a field of view that is greater than 180 degrees, and further comprising:
    adjusting the two-dimensional coordinate using a radial value that has been scaled according to the field of view; and
    using the adjusted two-dimensional coordinate in the mapping.

4. The method of claim 1, wherein the image includes a field of view of at least 180 degrees.

5. The method of claim 1, wherein the omnidirectional camera includes a fisheye lens.

6. The method of claim 1, wherein the 360-degree video data is obtained from an encoded bitstream, wherein the encoded bitstream includes the parameter of the omnidirectional camera.

7. The method of claim 6, wherein the parameter of the omnidirectional camera is encoded in a supplemental enhancement information (SEI) message in the encoded bitstream.

8. The method of claim 6, wherein the encoded bitstream is included in a file formatted according to an ISO base media file format, and wherein the parameter of the omnidirectional camera is encoded in a structure in the file.

9. The method of claim 6, wherein the parameter of the omnidirectional camera is a polynomial order, a polynomial coefficient, a polynomial scaling parameter, or a mapping scaling parameter.

10. An apparatus for processing encoded video, comprising:
a memory configured to store two-dimensional video data captured by an omnidirectional camera; and
a processor implemented in circuitry and configured to:
obtain the two-dimensional video data, wherein the two-dimensional video data includes an image of a scene, and wherein, in the image, the scene has been warped into a circular region of the image;
determine, for pixel locations in the circular region of the image, corresponding locations on a three-dimensional hemispherical representation of the image, wherein determining the corresponding locations includes applying a function that projects a point in the image, represented by a two-dimensional coordinate defined by a first angle in an image plane of the image and a distance from a center of the circular region of the image, to a corresponding point on the three-dimensional hemispherical representation, represented by a three-dimensional coordinate defined by a second angle in the image plane and a third angle in an orthogonal plane from the image plane;
map, using the two-dimensional coordinate and the three-dimensional coordinate, a pixel in the circular region of the image to the three-dimensional hemispherical representation of the image, wherein the point in the image provides the pixel to map to the point on the three-dimensional hemispherical representation; and
output the three-dimensional hemispherical representation for display in a 360-degree video presentation,
wherein the function is a polynomial function, of degree at least 2, in the distance from the center of the circular region of the image, and wherein the function applies a parameter of the omnidirectional camera to determine the three-dimensional coordinate.

11. The apparatus of claim 10, wherein the warping is non-linear, and wherein the processor is further configured to:
determine the two-dimensional coordinate using an adjusted radial value, wherein the adjusted radial value corresponds to the non-linearity of the warping.

12. The apparatus of claim 10, wherein the image includes a field of view that is greater than 180 degrees, and wherein the processor is further configured to:
adjust the two-dimensional coordinate using a radial value that has been scaled according to the field of view; and
use the adjusted two-dimensional coordinate in the mapping.

13. The apparatus of claim 10, wherein the image includes a field of view of at least 180 degrees.

14. The apparatus of claim 10, wherein the omnidirectional camera includes a fisheye lens.

15. The apparatus of claim 10, wherein the 360-degree video data is obtained from an encoded bitstream, wherein the encoded bitstream includes the parameter of the omnidirectional camera.

16. The apparatus of claim 15, wherein the parameter of the omnidirectional camera is encoded in a supplemental enhancement information (SEI) message in the encoded bitstream.

17. The apparatus of claim 15, wherein the encoded bitstream is included in a file formatted according to an ISO base media file format, and wherein the parameter of the omnidirectional camera is encoded in a structure in the file.

18. The apparatus of claim 15, wherein the parameter of the omnidirectional camera is a polynomial order, a polynomial coefficient, a polynomial scaling parameter, or a mapping scaling parameter.

19. The apparatus of claim 10, further comprising:
a mobile device, wherein the mobile device includes the omnidirectional camera.

20. An apparatus for decoding video, comprising:
a memory configured to store two-dimensional video data captured by an omnidirectional camera; and
a processor implemented in circuitry, configured to:
obtain the two-dimensional video data, wherein the two-dimensional video data includes an image of a scene, and wherein, in the image, the scene has been warped into a circular region of the image;
determine, for pixel locations in the circular region of the image, corresponding locations on a three-dimensional hemispherical representation of the image, wherein determining the corresponding locations includes applying a function that projects a point in the image, represented by a two-dimensional coordinate defined by a first angle in an image plane of the image and a distance from a center of the circular region of the image, to a corresponding point on the three-dimensional hemispherical representation, represented by a three-dimensional coordinate defined by a second angle in the image plane and a third angle in an orthogonal plane from the image plane;
map, using the two-dimensional coordinate and the three-dimensional coordinate, a pixel in the circular region of the image to the three-dimensional hemispherical representation of the image, wherein the point in the image provides the pixel to map to the point on the three-dimensional hemispherical representation; and
output the three-dimensional hemispherical representation for display in a 360-degree video presentation,
wherein the function is a polynomial function, of degree at least 2, in the distance from the center of the circular region of the image, and wherein the function applies a parameter of the omnidirectional camera to determine the three-dimensional coordinate.

21. The apparatus of claim 20, wherein the warping is non-linear, and wherein the processor is further configured to:
determine the two-dimensional coordinate using an adjusted radial value, wherein the adjusted radial value corresponds to the non-linearity of the warping.

22. The apparatus of claim 20, wherein the image includes a field of view that is greater than 180 degrees, and wherein the processor is further configured to:
adjust the two-dimensional coordinate using a radial that has been scaled according to the field of view; and
use the adjusted two-dimensional coordinate in the mapping.

23. The apparatus of claim 20, wherein the image includes a field of view of at least 180 degrees.

24. The apparatus of claim 20, wherein the omnidirectional camera includes a fisheye lens.

25. The apparatus of claim 20, wherein the 360-degree video data is obtained from an encoded bitstream, wherein the encoded bitstream includes the parameter of the omnidirectional camera.

26. The apparatus of claim 25, wherein the parameter of the omnidirectional camera is encoded in a supplemental enhancement information (SEI) message in the encoded bitstream.

27. The apparatus of claim 25, wherein the encoded bitstream is included in a file formatted according to an ISO base media file format, and wherein the parameter of the omnidirectional camera is encoded in a structure in the file.

28. The apparatus of claim 25, wherein the parameter of the omnidirectional camera is a polynomial order, a polynomial coefficient, a polynomial scaling parameter, or a mapping scaling parameter.

29. The apparatus of claim 20, further comprising:
a mobile device, wherein the mobile device includes the omnidirectional camera.

30. The apparatus of claim 20, further comprising:
a mobile device, wherein the mobile device includes a display for displaying the 360-degree video presentation.

31. A non-transitory computer-readable medium having stored thereon instructions that, when executed by one or more processors, cause the one or more processors to:
obtain two-dimensional video data captured by an omnidirectional camera, wherein the two-dimensional video data includes an image of a scene, and wherein, in the image, the scene has been warped into a circular region of the image;
determine, for pixel locations in the circular region of the image, corresponding locations on a three-dimensional hemispherical representation of the image, wherein determining the corresponding locations includes applying a function that projects a point in the image, represented by a two-dimensional coordinate defined by a first angle in an image plane of the image and a distance from a center of the circular region of the image, to a corresponding point on the three-dimensional hemispherical representation, represented by a three-dimensional coordinate defined by a second angle in the image plane and a third angle in an orthogonal plane from the image plane;
map, using the two-dimensional coordinate and the three-dimensional coordinate, a pixel in the circular region of the image to the three-dimensional hemispherical representation of the image, wherein the point in the image provides the pixel to map to the point on the three-dimensional hemispherical representation; and
output the three-dimensional hemispherical representation for display in a 360-degree video presentation,
wherein the function is a polynomial function, of degree at least 2, in the distance from the center of the circular region of the image, and wherein the function applies a parameter of the omnidirectional camera to determine the three-dimensional coordinate.

32. An apparatus, comprising:
means for obtaining two-dimensional video data, wherein the two-dimensional video data includes an image of a scene, and wherein, in the image, the scene has been warped into a circular region of the image;
means for determining, for pixel locations in the circular region of the image, corresponding locations on a three-dimensional hemispherical representation of the image, wherein determining the corresponding locations includes applying a function that projects a point in the image, represented by a two-dimensional coordinate defined by a first angle in an image plane of the image and a distance from a center of the circular region of the image, to a corresponding point on the three-dimensional hemispherical representation, represented by a three-dimensional coordinate defined by a second angle in the image plane and a third angle in an orthogonal plane from the image plane;
means for mapping, using the two-dimensional coordinate and the three-dimensional coordinate, a pixel in the circular region of the image to the three-dimensional hemispherical representation of the image, wherein the point in the image provides the pixel to map to the point on the three-dimensional hemispherical representation; and
means for outputting the three-dimensional hemispherical representation for display in a 360-degree video presentation,
wherein the function is a polynomial function, of degree at least 2, in the distance from the center of the circular region of the image, and wherein the function applies a parameter of the omnidirectional camera to determine the three-dimensional coordinate.

* * * * *